United States Patent
Parsons (12)

(10) Patent No.: US 6,734,229 B2
(45) Date of Patent: May 11, 2004

(54) COMPOSITE POLYMER CLAY MATERIAL AND PROCESS FOR PRODUCING THE SAME

(76) Inventor: James G. Parsons, 111 Madison, Rapid City, SD (US) 57701

( * ) Notice: Subject to any disclaimer, the term of this patent is extended or adjusted under 35 U.S.C. 154(b) by 356 days.

(21) Appl. No.: 09/912,793

(22) Filed: Jul. 24, 2001

(65) Prior Publication Data

US 2003/0022963 A1 Jan. 30, 2003

(51) Int. Cl.[7] .............................................. C08K 9/00
(52) U.S. Cl. ...................... 523/216; 524/442; 524/443; 524/493; 524/791
(58) Field of Search ........................ 523/216; 524/442, 524/443, 493, 791

(56) References Cited

U.S. PATENT DOCUMENTS

| | | | |
|---|---|---|---|
| 4,455,382 A | 6/1984 | Wu ................................. | 501/2 |
| 4,739,007 A | 4/1988 | Okada et al. ................ | 524/789 |
| 4,810,734 A | 3/1989 | Kawasumi et al. ......... | 523/216 |
| 4,894,411 A | 1/1990 | Okada et al. ................ | 524/710 |
| 5,032,546 A | 7/1991 | Giannelis et al. .............. | 501/3 |
| 5,032,547 A | 7/1991 | Giannelis et al. .............. | 501/3 |
| 5,698,624 A | * 12/1997 | Beall et al. .................. | 524/445 |
| 5,849,830 A | * 12/1998 | Tsipursky et al. ........... | 524/450 |
| 5,955,535 A | 9/1999 | Vaia et al. ................... | 524/791 |

OTHER PUBLICATIONS

Barrow; *Physical Chemistry*; The kinetic–molecular theory of gases, Chapter 2, pp. 50–51; and Liquids, Chapter 16, pp. 528–529.
Chen, An X–Ray and Chemical Study of Iron in Smectite Clays, A dissertation to the Office of Graduate Education and Research—South Dakota School of Mines and Technology, 1996 pp. 8 and 31–38.
Fuuerstenau et al., "Chemistry of Flotation", published by Society of Mining Engineers, 1985, pp. 1 and 92–93.
Giannelis, "Polymer Layered Silicate Nanocomposites", *Adv. Matter*, 8:1, 1996 p. 2935.
Gruenwald, "Plastics: How Structure Determines Properties", Thermal Properties of Polymeric Materials, Chapter 8, pp. 208–209.
Hunter, "Foundations of Colloid Science", vol. 1, University of Sydney–Australia, pp. 2–3 and 30–31.
Ives (editor), "The Science Basis of Flotation", Series E: Applied Sciences—No. 75, 1984, pp. 36–37.
Krishnamoorti et al., "Structure and Dynamics of Polymer–Layered Silicate Nanocomposites", *Chem. Mater.*, 1996, vol. 8, pp. 1728–1734.
Levy et al., "Interlayer Adsorption of Polyvinylpyrrolidone on Montmorillonite", *Journal of Colloid and Interface Science*, vol. 50, No. 3, Mar. 1975, pp. 442–450.
Mottana et al., "Guide to Rocks and Minerals", published by Simon & Schuster Inc., pp. 234–235.
Perloff, et al., Soil Mechanics Principles and Applications, published by The Ronald Press Company, pp. 398–399.
Petrucci, "General Chemistry and Modern Applications", California State University, Macmillan Publishing Company, pp. 352–355.
Seymour et al., "Polymer Chemistry—An Introduction", Undergraduate Chemistry A Series of Textbooks, Edited by J.J. Lagowski Department of Chemistry at the University of Texas at Austin, pp. 20–27.
Theng, "The Chemistry of Clay—Organic Reactions", Published by John Wiley & Sons, pp. 92–93, 208–209 and 268–269.
B.K.G. Theng, "Formation and Properties of Clay–Polymer Complexes", Soil Bureau, Department of Scientific and Industrial Research, Lower Hutt, New Zealand, Elsevier Scientific Publishing Company, pp. 63–133.
Fairbridge, "The Encyclopedia of Sedimentology", *Encyclopedia of Earth Sciences*, vol. VI, pp. 58–61.
The New Encyclopedia Britannica, vol. 21, 15th Edition, pp. 322–323.
Vaia, "Polymer Melt Intercalation in Mica–Type Layered Silicates", A Dissertation Presented to the Faculty of the Graduate School of Cornell University, May 1995.

* cited by examiner

*Primary Examiner*—Tae H. Yoon
(74) *Attorney, Agent, or Firm*—Sheridan Ross P.C.

(57) ABSTRACT

A process for producing a composite material comprising a polymer with polar or polarizable groups, a layered silicate dispersed therein, and a substance such as surfactant which controls the crystalline structure or molecular conformation of the polymer. The process produces the composite material without in situ formation or melting. The composite material has an increased glass transition temperature, improved mechanical strength and high optical clarity or transparency.

20 Claims, No Drawings

COMPOSITE POLYMER CLAY MATERIAL AND PROCESS FOR PRODUCING THE SAME

FIELD OF THE INVENTION

The present invention is directed to a composite material having high mechanical strength, increased glass transition temperature and high optical clarity or transparency, and to a process for producing the same. The composite material comprises a polymer with polar or polarizable groups, a layered silicate dispersed therein, and a substance such as a surfactant which controls the crystalline structure or molecular conformation of the polymer.

BACKGROUND OF THE INVENTION

Glass and mineral reinforced polymers have been produced to increase the strength and barrier properties of many polymer applications. Recently, polymer silicate composites have been produced to attain the same degree of stiffness and strength with less ceramic content than comparable glass or mineral reinforced polymers. These materials take the form of polymer-ceramic nanocomposites with layered silicates as the inorganic phase. The materials design and synthesis rely on the ability of layered silicates to intercalate in the galleries between their layers a wide range of monomers and polymers.

Polymer layered silicate composites exhibit desirable properties for use in many commercial applications. These composites are stiffer and stronger and have better barrier properties than comparable glass or mineral reinforced polymers with less inorganic content, making them lighter in weight. Additionally, these silicate polymer composites have increased thermal stability and self-extinguishing properties. Composites with these characteristics have applications in paint, varnishes, lacquers, liquid resins, epoxies and the like.

Because the silicate-layered composites achieve composite properties at much lower volume fraction of reinforcement, they avoid many of the costly and cumbersome fabrication techniques common to conventional fiber or mineral reinforced polymers. Known methods of making silicate-polymer composites involve forming the polymer in situ or carrying out intercalation by melting. U.S. Pat. No. 4,455,382 to Wu teaches the production of a polar liquid to disintegrate a glass-ceramic body prior to reaction with organic polycations to form the interlayer of the crystals to form an organic-inorganic composite. U.S. Pat. No. 4,739,007 to Okada et al teaches the use of an aqueous swelling agent mixed with a crushed clay material followed by ion exchange with an organic cation previously mixed with the swelling agent to produce a composite material. U.S. Pat. No. 4,894,411 to Okada et al expands on this method by introducing a polyamide monomer as the organic cation followed by polymerization of the monomer by heating in the presence of a phenol or polyamine stabilizer. U.S. Pat. No. 4,810,734 to Kawasumi et al teaches mixing a layered clay with a swelling agent to form a complex that is mixed with a monomer to intercalate into the layered material followed by polymerization of the monomer to form a composite material. U.S. Pat. No. 5,955,535 to Vaia et al teaches the intercalation of a polymer into the galleries of layered silicate by heating the polymer-silicate mixture to above the melting or glass transition temperature of the polymer in the absence of a solvent. This last method produces the sought after polymer-clay composites with small visible flecks of the organically modified clay and other suspended impurity materials thereby limiting their potential use in applications requiring transparency and temperature resistance. Accordingly, a new method of producing polymer-clay composites resulting in a transparent composite with better thermal properties is desired.

SUMMARY OF THE INVENTION

The process of the present invention produces composite polymer clay materials in a process using a solvent to intercalate the polymer in the clay material without in situ formation of the polymer or melting of the polymer. This process provides less expensive synthetic pathways to produce composite polymer clay materials with enhanced strength and stiffness.

The process utilizes a solvent for fabricating modified polymer clay materials in a process that is cleaner than a melt fabrication process and therefore likely to result in a transparent final material. In this process, an aliphatic salt is introduced into the galleries of a layered silicate in the presence of a solvent. The polymer is then mixed with the silicate in the same or another appropriate solvent and the solvent is evaporated, resulting in an optically transparent modified clay with an intercalated polymer.

DETAILED DESCRIPTION OF THE INVENTION

The method of the present invention is directed to the formation of a modified clay with an intercalated polymer from a suitable gallery-containing crystalline material and a polymer containing polar or polarizable portions.

In one embodiment of the present invention, the crystalline starting material is a gallery-containing crystalline silicate. The crystal of the silicate layer consists of two silica tetrahedral layers fused to an edge-shared octahedral sheet consisting nominally of aluminum or magnesium hydroxides; these layered or mica-type layered silicates are some times referred to as MTS. The stacking of the layers provides interlayers or galleries between the layers. The galleries are normally occupied by cations that balance the charge deficiency that is generated by the isomorphous substitution within the layers. Besides the charge-balancing cations, water is also present in the galleries where it tends to associate with the cations. The silicates are referred to as gallery-containing to denote the layers between the lattice sheets wherein the associated cations and water molecules reside. These silicates include smectite clay minerals (e.g., montmorillonite, saponite, beidellite, nontronite, hectorite and stevensite), vermiculite, halloysite, or synthetic silicates such as laponite, fluorhectorite, and hydroxyl hectorite. Additionally, semi-synthetic silicates can be produced which are composed of solid solutions of any of the synthetic silicates and structurally-compatible natural silicates such as talc, fluortalc, polylithionite, and fluorpolylithionite. The preferred silicates are the smectite clay minerals and the most preferred silicate is montmorilonite.

The gallery-containing silicates are normally associated with charge balancing cations selected from the group consisting of sodium ions, potassium ions, lithium ions, calcium ions and magnesium ions. In the case of polymers which do not contain hydrophilic moieties, intercalation of the polymer into the galleries cannot be obtained when the charge balancing cations are those normally present (i.e., sodium ions, potassium ions, lithium ions, calcium ions or magnesium ions). In this case, the charge-balancing cations must be replaced with organic cations having at least one organophilic group for subsequent mixing of the hydrophobic polymer to be obtained. The silicates can be modified to contain such organic cations via ion exchange processes as taught by Okada et al (U.S. Pat. Nos. 4,739,007 and 4,894,411) and Kawasumi et al (U.S. Pat. No. 4,810,734).

Organic cations suitable for substitution for the naturally occurring charge balancing cations include, for example, substituted ammonium ions (such as octadecyl dimethyl ammonium ions or dodecylammonium ions) or other mono or di C8–C18 alkylammonium ions or where substitution is by —R—COOH wherein R denotes an alkylene group which may contain phenylene, vinylene, branching and/or other linkages (such as 12-amino-dodecanoic acid ions) or organophosphonium ions (such as C8–C18 alkylphosponium ions) or organosulfonium ions (such as C8–C18 alkylsulfonium ions). The preferred organic cations are substituted ammonium ions and the most preferred organic cation is n-octadecylammonium.

In the first step of this embodiment, the naturally occurring charge balancing cations within the gallery-containing silicates are replaced with an organic cation. This reaction takes place in a solution of equal parts ethanol and water. The ratio of crystalline silicate to organic cation preferably is between about 1:80 and about 1:120, and more preferably is between about 1:90 and about 1:100. The gallery-containing silicate swells and dissolves in the aqueous ethanol solution to produce a cloudy suspension of silicates with the organic cations associated with the negatively charged regions on the surface of the crystalline lattice. In this way, the silicate particles coated with the organic cations form micelles in the aqueous ethanol solution. This suspension is then filtered by any means known in the art to remove the remaining undissolved crystalline solids of a size greater than 10 micrometers. The resulting filtered suspension containing the silicate-in-cation micelles is mixed with a solvent and allowed to stand preferably for between about 12 hours to about 48 hours, and more preferably for between about 24 hours to about 36 hours. In this time, the water in the aqueous ethanol solution separates from the organic solvent producing an organic solvent-water bilayer. The aqueous layer is decanted off and the organic solvent layer containing the silicate-in-cation micelles is retained. The organic solvent serves as the medium in which the micelles are uniformly mixed with the polymer to form the composite polymer clay product. Suitable solvents include the organic solvents such as chloroform, other chlorinated hydrocarbons such as ethylene chloride, fluorinated hydrocarbons such as flourobenze or 1-flouropentane, brominated hydrocarbons such as bromoform or bromobenzene, iodated hydrocarbons 1-iodopentane or iodobenzen, hydrocarbons such as cyclohexane, heptane, aromatic hydrocarbons such as toluene or benzene, ethers such as diethyl ether, petroleum extracts such as petroleum either, or gasoline. The preferred solvent is chloroform. The solvent may be removed by any means known in the art to recover powdered micelles. For example, the solvent may be removed under vacuum, oven drying or evaporation. Preferably, the solvent is evaporated if recovery of the powdered micelles is desirable.

The polymer to be mixed with the micelles-in-solvent solution can be either thermoplastic or thermosetting. Thermoplastic polymers are preferred. Examples of thermoplastic polymers include vinyl polymers (e.g., polystyrene, polyethylene, polypropylene, ethylene-propylene diene monomer polymers, acrylonitrile-styrene-butadiene copolymers and rubber), polyalkylene oxides (e.g., poly(ethylene oxide)), polyamides (e.g., nylons, such as nylon-6 (polycaprolactam), nylon-66 (poly (hexamethylene adipamide)), nylon-11, nylon-12, nylon-46, nylon-7, or nylon-8), polyesters (e.g., polyethylene terephthalate and polybutylene terephthalate), vinylidene polymers (e.g., poly (vinylidene fluoride) and poly(vinylidene chloride)), fluoropolymers (e.g., polytetrafluorethylene and polychlorotrifluoroethylene), polysiloxanes (e.g., polydimethylsiloxanes), polyphenylene sulfides, polyacetals, polycarbonates, polysulfones and polyether sulfones, either alone as a blend, a copolymer, or a block polymer. Examples of thermosetting resins are phenolic resins, epoxy resins, unsaturated polyester resins, alkyd resins, furan resins, urea resins, melamine resins, polyurethane resins and aniline resins, either alone as a blend, a copolymer, or as a block polymer. These micellar systems may be more easily applied to blends of acetates, lacquers, or polyurethanes. This assumes a suitable solvent system is supporting the mixture; such solvent systems are often used in commercial oil based paints such as enamels.

The chosen polymer is dissolved in solvent and mixed with the silicate-in-cation micelles in solvent suspension produced in the initial steps of the present invention as described above. The polymer and micelle suspensions are mixed together at room temperature to form the organically modified clay polymer composite. The surfactant that is attached through ionic forces to the clay interacts with the polymer. The aliphatic portions of the surfactant are arranged in an orderly fashion across the surface of a suitable substrate such as a montmorillonite crystal. This method allows the presentation of an ordered, periodic arrangement of aliphatic surfactant molecules to the subject polymer molecules. The polymers that interact well with these micelle structures have polar or polarizable portions and nonpolar portions in their monomers. Examples include polyurethanes and lacquers. The aliphatic portions of the surfactant interact through van der Waals forces with the aliphatic portion of the subject polymeric molecules. Other, nearby polymer chains interact through polar and nonpolar forces with the polymeric molecules that have interacted with the surfactant molecules. This process continues with more interacting polymer molecules. Thus the micelles act as seeds in a crystallizing process. The temperature used should be below the decomposition point of the polymer. Typically, these interactions are completed in a period of about 0.5 hours to about 50 hours. Use of dynamic conditions (mixing or shaking) during this process can decrease the temperature and/or time required for interaction. The intercalated polymers adopt a collapsed conformation in which the polymer chains are extended and not in their usual random coil conformation. The polymer clay composites display increases in glass transition temperatures (Tg) from about 1% to about 20% depending on the amount of organically modified clay incorporated into the polymer and the specific properties of the organic cation used. This behavior is qualitatively different from that exhibited by bulk polymer and is attributed to the interaction of the polymer chains with the micelle structures of the organically modified clay. The polymer-organically modified clay mixtures exhibit dimensional stability and increased tensile strength over that of the unmixed polymer. The resulting composite in organic solvent solution is exposed to air or vacuum dried for about 5–10 hours until the organic solvent has completely evaporated to leave the solid, organically-modified, clay-polymer composite.

In another embodiment of the present invention, the starting material is hydrated water glass (sodium silicate), fly ash or light ash, carbon black, minerals such as clays, finely divided silicates, or metallic sulfides, sulfates, or oxides. Some metals such as gold, chromium, or nickel can also be used for the micellar cores, if the particles are of colloidal size. Polymeric microspheres constructed with styrene or cellulose acetate can also be used as micellar cores in this process. A charge can be imparted to these materials through mechanical means such as rubbing or grinding and the like or with the use of electrostatic devices as well as chemical means well known in the art.

A slip is a clay such as bentonite that has a small amount of water glass added to it. The water glass partially suppresses the clay particles' surface charge. If water glass is used in this way it is called a suspending agent. In this embodiment, an anionic soap is used to construct the micelles. The process consists of dissolving sodium stearate soap in water. An aqueous slurry of a slip, such as bentonite that has a small amount of water glass added to it, is made by adding about 30% to about 50% distilled water (weight/volume) to the dry slip and mixed well. After mixing, a small amount of the slip/water slurry is added to the soap/water solution and mixed well. The mixture is then allowed to stand for about ten minutes so that the soap molecules may ionically attach to the slip particles. A small amount of a liquid hydrocarbon such as petroleum ether is then added with two to three drops of anhydrous isopropyl alcohol, mixed well and allowed to stand for about an hour. The slip particles that are of colloidal size are coated with the soap ions and therefore soluble in the organic layer. The colloidal sized structures may be observed in the organic layer by the use of the Tyndall Effect. The process is evident as visible particles gradually disappear in the organic layer. The organic layer is then carefully decanted off and the organic layer is allowed to evaporate off to recover the micelles. At this point, the product may be collected for later use. An anhydrous alcohol is used to introduce the micelles formed into the galleries of the starting materials. Suitable anhydrous alcohols include 2-butanol, 3-pentanol or preferably isopropyl alcohol. In this mixture, hydrated water glass particles are coated with the anions to form micelles in the anhydrous alcohol solution. This suspension is then filtered to remove the remaining undisclosed crystalline solids of a size greater than 10 micrometers. The alcohol is then evaporated to leave a friable material comprising the anionic micelles, which can be mixed with polymers in a solvent system.

The resulting friable material containing the anionic micelles is mixed with a solvent, which serves as the medium for mixing the micelles with a polymer to form the composite polymer product. Suitable solvents include solvents such as chloroform, other chlorinated hydrocarbons chlorobenzene, fluorinated hydrocarbons flurobenzenne or 1-fluropentane, brominated hydrocarbons such as bromobenzene or 1-bromopentane, iodated hydrocarbons iodobezene or 1-iodopentane, hydrocarbons such as cyclohexane, heptane, aromatic hydrocarbons such as toluene or benzene, ethers such as diethyl ether, petroleum extracts such as petroleum ether, or gasoline. The polymer to be mixed with the micelle solution can be either thermoplastic or thermosetting as described above for the first embodiment of the invention. The polymer is dissolved in the solvent and mixed with the anionic micelles in solvent suspension at room temperature to form the modified polymer composite containing the anionic micelles. The interactions between the anionic micelles and the polymer is similar to the interactions between the cationic micelles and polymers described above and the conditions for their formation remain the same resulting in polymer composites with the same increases in mechanical strength and glass transition temperature while retaining a high transparency.

What is claimed is:

1. A process for producing a composite polymer clay material comprising the steps of:
    a) combining a gallery-containing crystalline silicate with an organic cation in aqueous ethanol to produce an organically modified silicate suspension;
    b) combining said organically modified silicate suspension in an organic solvent; and,
    c) combining said silicate suspension in said organic solvent with a polymer dissolved in an organic solvent to produce a composite polymer clay material.

2. The process of claim 1 wherein said gallery-containing crystalline silicate is combined with said organic cation in a ratio of about 1:80 to about 1:120.

3. The process of claim 1 wherein the gallery-containing crystalline silicate is combined with the organic cation in a ratio of about 1:90 to about 1:100.

4. The process of claim 1 wherein said gallery-containing crystalline silicate is selected from the group consisting of smectite clay minerals, montmorillonite, hectorite, fluorhectorite, hydroxyl hectorite, saponite, laponite, and combinations thereof.

5. The process of claim 3 wherein said gallery-containing crystalline silicate is a montmorillonite containing a cation selected from the group consisting of sodium, potassium, lithium, and calcium cations.

6. The process of claim 4 wherein said montmorillonite is sodium montmorillonite.

7. The process of claim 1 wherein said organic cation is selected from the group consisting of primary aliphatic amines and mono or di C8–C18 alkylammonium ions.

8. The process of claim 2 wherein said ratio of gallery-containing crystalline silicate to organic cation is about 1:100.

9. The process of claim 1 wherein said polymer is selected from the group consisting of vinyl polymers, polyalkylene oxides, polyesters, vinylidene polymers, fluoropolymers, polysiloxanes, polyphenylene sulfides, polyacetals, polycarbonates, polysulfones, polyether sulfones, phenolic resins, epoxy resins, alkyd resins, furan resins, urea resins, melamine resins, polyurethane resins and aniline resins.

10. The process of claim 9 wherein said polymer is a polycarbonate.

11. The process of claim 1 further comprising heating an amine in the presence of a strong acid to form said organic cation prior to combining with said gallery-containing crystalline silicate.

12. The process of claim 11 wherein said strong acid is hydrochloric acid.

13. The process of claim 1 comprising the further step of:
    filtering said organically modified silicate suspension to remove particles larger than about 10 micrometers.

14. The process of claim 13 comprising the further step of:
    agitating said organically modified silicate suspension in an organic solvent and allowing said agitated suspension to stand undisturbed from about 12 to about 24 hours.

15. The process of claim 13 comprising the further step of:
    decanting said organically modified silicate suspension in an organic solvent to remove any aqueous layer that has separated from the solvent layer prior to combining with said polymer in solvent solution.

16. The process of claim 14 comprising the further step of:
    evaporating the solvent from said clay material.

17. A process for producing a composite polymer clay material comprising the steps of:

a) combining a gallery-containing crystalline silicate with an organic cation in aqueous ethanol to produce an organically modified silicate suspension;

b) combining said organically modified silicate suspension in an organic solvent;

c) evaporating said organic solvent to recover micelles; and, d) combining said micelles with a polymer dissolved in a solvent to produce a polymer clay material.

18. A process for producing a composite polymer clay material comprising the steps of:

a) combining a gallery-containing crystalline silicate with an organic cation to produce an organically modified silicate suspension;

b) combining said organically modified silicate suspension in an equal volume of anhydrous isopropyl alcohol and an organic solvent to produce micelles;

c) combining said micelles with a polymer dissolved in a solvent to produce a polymer clay material.

19. A silicate-polymer composite containing a transparent colloidal silicate suspension prepared by the process of claim 1.

20. A silicate-polymer composite containing a transparent colloidal silicate suspension prepared by the process of claim 18.

* * * * *

UNITED STATES PATENT AND TRADEMARK OFFICE
CERTIFICATE OF CORRECTION

PATENT NO. : 6,734,229 B2
DATED : May 11, 2004
INVENTOR(S) : James Parsons

It is certified that error appears in the above-identified patent and that said Letters Patent is hereby corrected as shown below:

<u>Column 1,</u>
Line 5, please insert the following paragraph:
-- GOVERNMENT INTEREST This invention was made with Government support under grant number DMR-98-15957 awarded by the National Science Foundation (NSF). The Government has certain rights in this invention. --.

Signed and Sealed this

Twenty-ninth Day of November, 2005

JON W. DUDAS
*Director of the United States Patent and Trademark Office*